United States Patent
Julian et al.

(10) Patent No.: US 7,440,399 B2
(45) Date of Patent: Oct. 21, 2008

(54) APPARATUS AND METHOD FOR EFFICIENT TRANSMISSION OF ACKNOWLEDGMENTS

(75) Inventors: David Jonathan Julian, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 11/021,790

(22) Filed: Dec. 22, 2004

(65) Prior Publication Data
US 2006/0133273 A1 Jun. 22, 2006

(51) Int. Cl.
*H04L 12/26* (2006.01)
(52) U.S. Cl. .............. 370/230; 370/462; 370/342; 370/329; 370/328; 455/436; 455/522
(58) Field of Classification Search ............ 370/462, 370/342, 329, 328
See application file for complete search history.

(56) References Cited

U.S. PATENT DOCUMENTS

| | | | |
|---|---|---|---|
| 5,625,892 A | 4/1997 | Bauman et al. | |
| 6,028,851 A * | 2/2000 | Persson et al. | 370/329 |
| 6,163,696 A * | 12/2000 | Bi et al. | 455/436 |
| 6,671,266 B1 * | 12/2003 | Moon et al. | 370/342 |
| 6,807,160 B1 * | 10/2004 | Laroia et al. | 370/329 |
| 2002/0181637 A1 * | 12/2002 | Nakabayashi | 375/358 |
| 2004/0072568 A1 * | 4/2004 | Kim | 455/445 |
| 2004/0152481 A1 * | 8/2004 | Georgeaux et al. | 455/522 |
| 2005/0053029 A1 * | 3/2005 | Lee et al. | 370/328 |
| 2005/0088990 A1 * | 4/2005 | Gibbons et al. | 370/329 |

FOREIGN PATENT DOCUMENTS

| | | |
|---|---|---|
| EP | 1322058 A1 | 6/2003 |
| WO | WO 99/04536 | 1/1999 |
| WO | WO 2004/039140 A2 | 5/2004 |

* cited by examiner

*Primary Examiner*—David Q Nguyen
(74) *Attorney, Agent, or Firm*—Sandip S. Minhas; Donald C. Kordich; Thomas R. Rouse

(57) ABSTRACT

Method and apparatus for transmission of information in multiple access communication system is described. Information from a plurality of access terminals is received. Alternatively, an access terminal determines what information needs to be sent to the access point. A determination is made as to whether sufficient resources, such as time, power level, or channels, are available to send an indication of acknowledgment. If sufficient resources are not available at the given time, the transmission of an indication of acknowledgment is delayed until sufficient resources are available.

32 Claims, 9 Drawing Sheets

FIG. 9

APPARATUS AND METHOD FOR EFFICIENT TRANSMISSION OF ACKNOWLEDGMENTS

BACKGROUND

I. Field

The invention relates generally to the field of wireless communications, and more particularly to a method, apparatus, and system for selectively responding to incremental redundancy transmissions in multiple access communication systems.

II. Background

In recent years, communication systems' performance and capabilities have continued to improve rapidly in light of several technological advances and improvements with respect to telecommunication network architecture, signal processing, and protocols. In the area of wireless communications, various multiple access standards and protocols have been developed to increase system capacity and accommodate fast-growing user demand.

Figure 1:
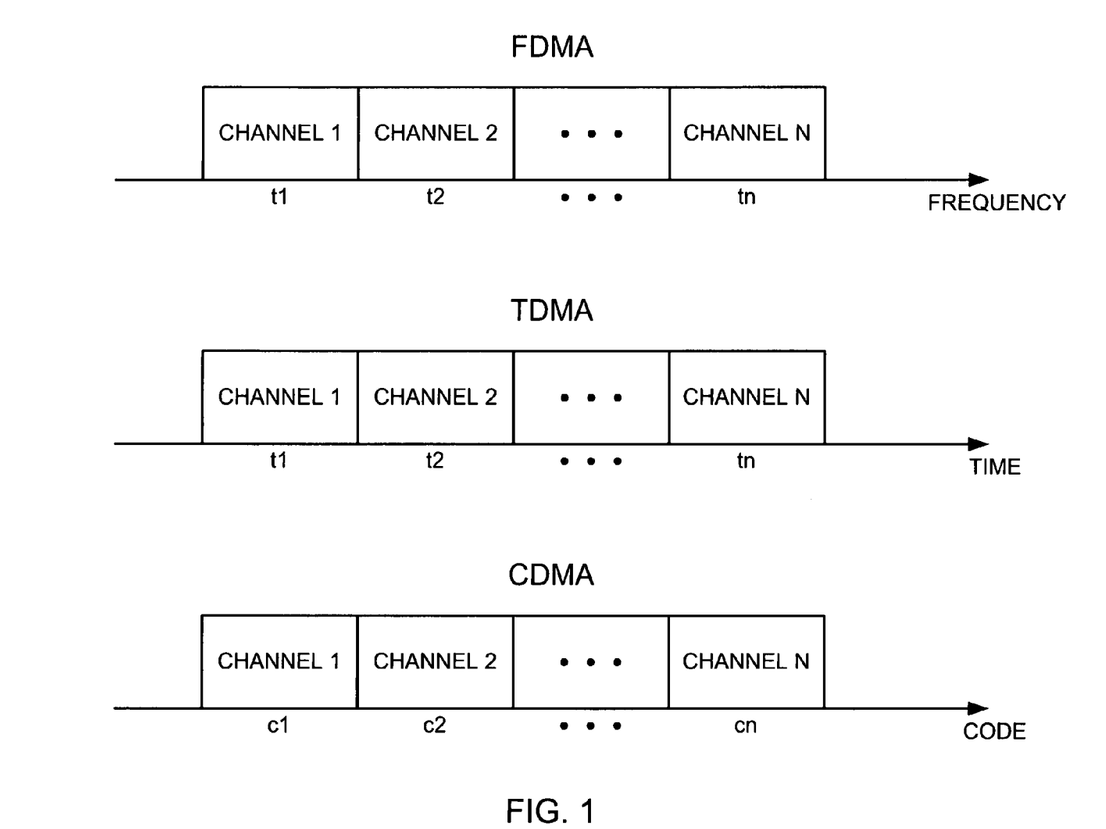
FIG. 1 is a diagram illustrating various channelization schemes in various multiple access systems.

These various multiple access schemes and standards include Time Division Multiple Access (TDMA), Frequency Division Multiple Access (FDMA), Code Division Multiple Access (CDMA), and Orthogonal Frequency Division Multiple Access (OFDMA), etc. Generally, in a system which employs TDMA technique, each user is allowed to transmit information in his assigned or allocated time slots whereas an FDMA system allows each user to transmit information on a particular frequency that is assigned to that particular user. A CDMA system, in contrast, is a spread spectrum system which allows different users to transmit information at the same frequency and at the same time by assigning a unique code to each user. In an OFDMA system, a high-rate data stream is split or divided into a number of lower rate data streams which are transmitted simultaneously in parallel over a number of subcarriers (also called subcarrier frequencies herein). Each user in an OFDMA system is provided with a subset of the available subcarriers for transmission of information. The subset of carriers provided to each user in an OFDMA system can be fixed or vary, for example, in the case of Frequency-Hopping OFMDA (FH-OFDMA). Multiple access techniques in TDMA, FDMA, and CDMA are illustrated in FIG. 1. The communication channels in FDMA are separated by frequencies in which a particular channel corresponds to a particular frequency. In a TDMA system, the communication channels are separated by time in which a particular channel corresponds to a particular time slot. In contrast, communication channels in a CDMA system are separated by codes in which a particular channel corresponds to a particular code.

In wireless systems, it is usually inefficient to guarantee a reliable packet transfer on every single transmission. The inefficiency is particularly pronounced in systems where underlying channel conditions vary drastically from transmission to transmission. For example, in an FH-OFDMA system, there is a wide variation in the received signal-to-noise ratio (SNR) between frames/packets, thus making it difficult and inefficient to guarantee a small frame error rate (FER) for each packet transmission. Such difficulty and inefficiency also apply to other communication systems which employ orthogonal multiple access techniques including, but are not limited to, TDMA, FDMA, and orthogonal CDMA, etc.

In such communication systems, a packet retransmission mechanism such as the Automatic Retransmission/Repeat Request (ARQ) scheme may be used to help increase efficiencies in message transmissions. Upon successful receipt of such transmissions, the access point typically sends an indicator of acknowledgment (i.e., an ACK message) to the access terminal of having received the data. For users far from the center of transmission of the cell, a relatively high level of power, time, or bandwidth is needed for messages to be transmitted to users far from the transmission point of the cell. As such, a more substantial amount of system resources is needed in order for information and messages to be sent to such users. In contrast, a user close to the center of transmission of the access point does not require a high level of power, bandwidth or time for messages sent to the access terminal.

Accordingly, there exists a need to minimize the necessity to respond to users relatively far from the center of transmission of the access point.

SUMMARY

Methods and apparatus for transmission of information in multiple access communication system are described. In one aspect, information from a plurality of access terminals is received. The information transmitted and received may use incremental redundancy schemes. At least one of the access terminals is relatively close to the access point and at least one of the terminals is relatively far from the access point. A determination is made as to whether sufficient resources, such as time, power level, or channels, are available to send an indication of acknowledgment to the access terminals. If sufficient resources are not available at the given time, the transmission of an indication of acknowledgment is delayed to the access terminals relatively far from the access point until sufficient resources are available.

In another embodiment a receiver is configured to receive information from a plurality of access terminals. A processor is configured to determine if sufficient resources are available to send an indication of acknowledgment to the access terminals. A controller is configured to delay transmission of an indication of acknowledgment to the access terminals relatively far from the access point until sufficient resources are available. Also, a counter may be used to keep track of the quantity of messages received from at least a portion of the access terminals, such as the terminals far from the access point. Unless access terminals receive some indication of acknowledgment after a certain number of attempts, the access terminal may assume that it is no longer in communication with the access point. Thus, the counter may be compared against a threshold value, where the threshold value may be set to the number of attempts. Thus, the access point needs to respond to the access terminals within the threshold number of attempts in order to maintain communications. Therefore, a transmitter is configured to transmit an indication of acknowledgment to the access terminals relatively far from the access point when the counter exceeds the threshold value.

In another embodiment, a method and apparatus for transmitting information in a multiple access communication system is described. A device receives information, and determines if sufficient resources are available to send an indication of acknowledgment. If such resources are not available, the device delays transmission of an indication of acknowledgment until sufficient resources are available. Resources include a determination as to whether sufficient power, time, or frequency channels are available to send an indication of acknowledgment.

In another embodiment, a method and apparatus for transmitting information from an access terminal is described. Information is received from an access point. A determination is made as to whether sufficient resources are available to send an indication of acknowledgment to the access point. If not, transmission of an indication of acknowledgment is delayed to the access point until sufficient resources are available. Also, a counter may be used to determine that an indication of acknowledgment needs to be sent to the access point before a maximum number of allowable non-responses is reached.

Various aspects and embodiments of the invention are described in further detail below.

BRIEF DESCRIPTION OF THE DRAWINGS

Various aspects and features of the present invention are disclosed by the following detailed description and references to the accompanying drawings, in which.

DETAILED DESCRIPTION

In the following detailed description numerous specific details are set forth. However, it is understood that various embodiments of the invention may be practiced without these specific details. It should be appreciated and understood by one skilled in the art that the various embodiments of the invention described below are exemplary and are intended to be illustrative of the invention rather than limiting.

As described herein, according to one embodiment of the invention, a method is provided to allow efficient user-multiplexing in a multiple access system which employs an incremental redundancy transmission scheme, such as the Automatic Repeat/Retransmission (ARQ) scheme. In the examples that are provided below, while ARQ systems are discussed for the purposes of explanation and illustration, it should be understood and appreciated by one skilled in the art that the teachings of the present invention are not limited to multiple access system with ARQ transmission schemes, but are also equally applicable to other multiple systems which employ different numbers of interlaces for the purposes of providing redundancy.

The techniques described herein for using multiple modulation schemes for a single packet may be used for various communication systems such as an Orthogonal Frequency Division Multiple Access (OFDMA) system, a Code Division Multiple Access (CDMA) system, a Time Division Multiple Access (TDMA) system, a Frequency Division Multiple Access (FDMA) system, an orthogonal frequency division multiplexing (OFDM)-based system, a single-input single-output (SISO) system, a multiple-input multiple-output (MIMO) system, and so on. These techniques may be used for systems that utilize incremental redundancy (IR) and systems that do not utilize IR (e.g., systems that simply repeats data).

Figure 2:
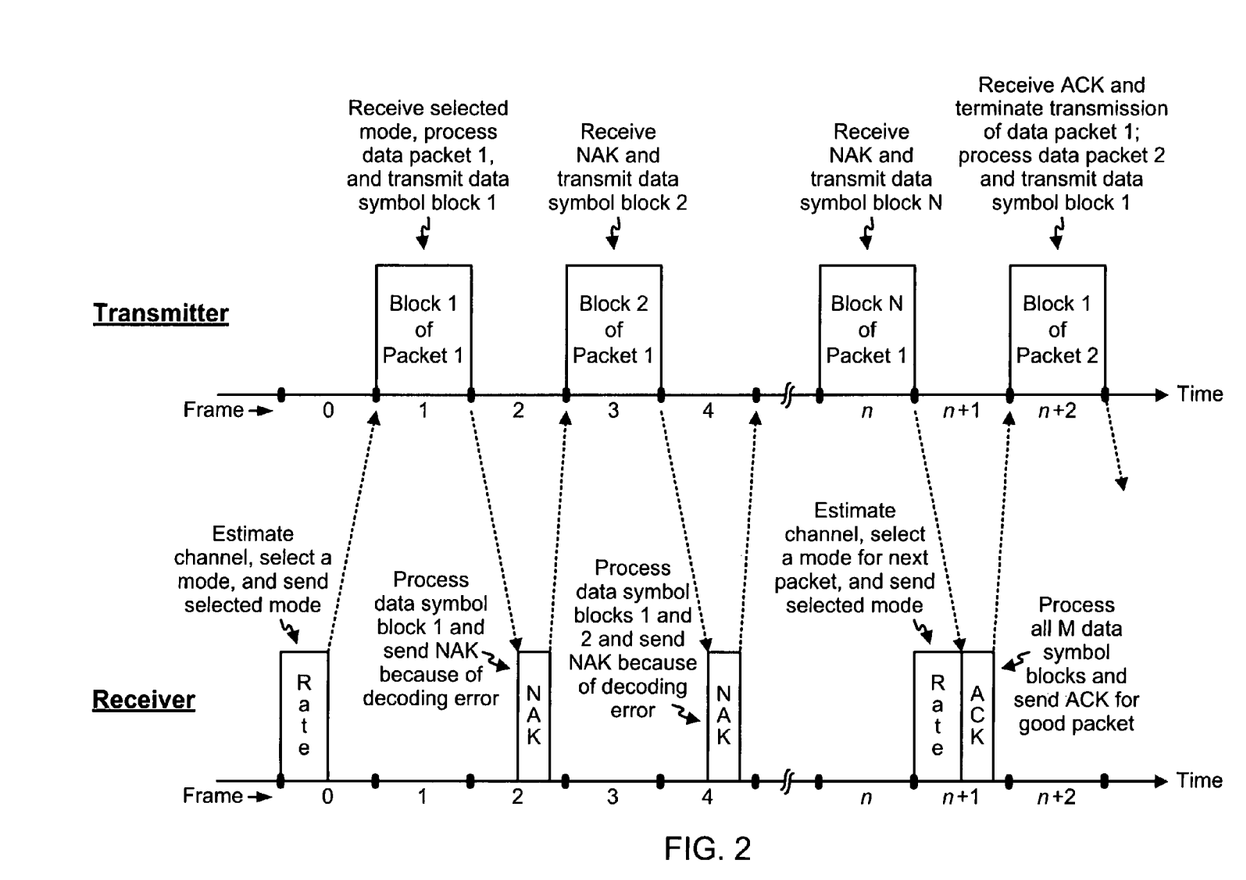
FIG. 2 illustrates an incremental redundancy transmission.

FIG. 2 illustrates an incremental redundancy transmission between a transmitter and a receiver in a communication system. The timeline for data transmission is partitioned into frames, with each frame having a particular time duration. For the incremental redundancy transmission embodiment shown in FIG. 3, the receiver initially estimates the communication channel, selects a "mode" based on the channel condition, and sends the selected mode to the transmitter in frame 0. Alternatively, the receiver sends back an estimate of the channel quality, and the transmitter selects the mode based on the channel quality estimate. In any case, the mode may indicate the packet size, the code rate, the modulation scheme, and so on, for the packet. The transmitter processes a data packet (Packet 1) in accordance with the selected mode, and generates up to T blocks of data symbols for the packet. T is the maximum number of blocks for a given data packet and is greater than one (T>1) for incremental redundancy. The first block typically contains sufficient information to allow the receiver to decode the packet under good channel condition. However, some packet formats may not be decodable on the first attempt to allow for better HARQ granularity. Each subsequent block typically contains additional parity/redundancy information not contained in prior blocks. The transmitter then transmits the first data symbol block (Block 1) for Packet 1 in frame 1. The receiver receives, detects, and decodes the first data symbol block, determines that Packet 1 is decoded in error (i.e., "erased"), and sends back a negative acknowledgment (NAK) in frame 2. The transmitter receives the NAK and transmits the second data symbol block (Block 2) for Packet 1 in frame 3. The receiver receives and detects Block 2, decodes Blocks 1 and 2, determines that Packet 1 is still decoded in error, and sends back another NAK in frame 4. The block transmission and NAK response may repeat any number of times.

For the example shown in FIG. 2, the transmitter receives a NAK for data symbol block N−1 and transmits data symbol block N (Block N) for Packet 1 in frame n, where N≦T, where T is the maximum number of transmission attempts for a packet. The receiver receives and detects Block N, decodes Blocks 1 through N, determines that the packet is decoded correctly, and sends back an acknowledgment (ACK) in frame n+1. The receiver also estimates the communication channel, selects a mode for the next data packet, and sends the selected mode to the transmitter in frame n+1. Mode selection may be indicated in the CQI sent at a periodic rate, or previous modes may be used. The transmitter receives the ACK for Block N and terminates the transmission of Packet 1. The transmitter also processes the next data packet (Packet 2) in accordance with the selected mode, and transmits the first data symbol block (Block 1) for Packet 2 in frame n+2. The processing at the transmitter and receiver continues in the same manner for each data packet transmitted via the communication channel.

As shown in FIG. 2, with incremental redundancy, the transmitter sends each data packet in a series of block transmissions, with each block transmission carrying a portion of the packet. The receiver may attempt to decode the packet after each block transmission based on all blocks received for the packet. The transmitter terminates the transmission of the packet after successful decoding by the receiver.

For the example shown in FIG. 2, there is a delay of one frame for the ACK/NAK response from the receiver for each block transmission. In general, this delay may be one or multiple frames. To improve channel utilization, multiple data packets may be transmitted in an interlaced manner. For example, data packets for one traffic channel may be transmitted in odd-numbered frames and data packets for another traffic channel may be transmitted in even-numbered frames. More than two traffic channels may also be interlaced, e.g., if the ACK/NAK delay is longer than one frame.

The system may be designed to support a set of modes, which may also be called rates, packet formats, radio configurations, or some other terminology. Each mode may be associated with a particular code rate or coding scheme, a particular modulation scheme, a particular spectral efficiency, and a particular minimum signal-to-noise-and-interference ratio (SINR) required to achieve a target level of performance, e.g., 1% packet error rate (PER). Spectral efficiency refers to the data rate (or the information bit rate) normalized by the system bandwidth, and is given in units of bits per second per Hertz (bps/Hz). In general, higher SINRs are needed for higher spectral efficiencies. The set of supported modes covers a range of spectral efficiencies, typically in increments that are somewhat evenly spaced. For a given channel condition and received SINR, the mode with the highest spectral efficiency supported by that received SINR may be selected and used for data transmission.

Spectral efficiency is determined by the code rate and modulation scheme. The code rate is the ratio of the number of input bits into an encoder to the number of code bits generated by the encoder and transmitted. For example, a code rate of 2/9 (or R=2/9) generates nine code bits for every two input bits. A lower code rate (e.g., R=1/4 or 1/5) has more redundancy and thus greater error correction capability. However, more code bits are transmitted for a lower code rate, and spectral efficiency is thus also lower.

Various modulation schemes may be used for data transmission. Each modulation scheme is associated with a signal constellation that contains M signal points, where M>1. Each signal point is defined by a complex value and is identified by a B-bit binary value, where $B \geq 1$ and $2^B=M$. For symbol mapping, the code bits to be transmitted are first grouped into sets of B code bits. Each set of B code bits forms a B-bit binary value that is mapped to a specific signal point, which is then transmitted as a modulation symbol for that group of B code bits. Each modulation symbol thus carries information for B code bits. Some commonly used modulation schemes include Binary Phase Shift Keying (BPSK), Quadrature Phase Shift Keying (QPSK), M-ary Phase Shift Keying (M-PSK), and M-ary Quadrature Amplitude Modulation (M-QAM). The number of code bits per modulation symbol (B) can be given as: B=1 for BPSK, B=2 for QPSK, B=3 for 8-PSK, B=4 for 16-QAM, B=6 for 64-QAM, and so on. B is indicative of the order of a modulation scheme, and more code bits may be sent per modulation symbol for higher order modulation schemes.

Figure 3:
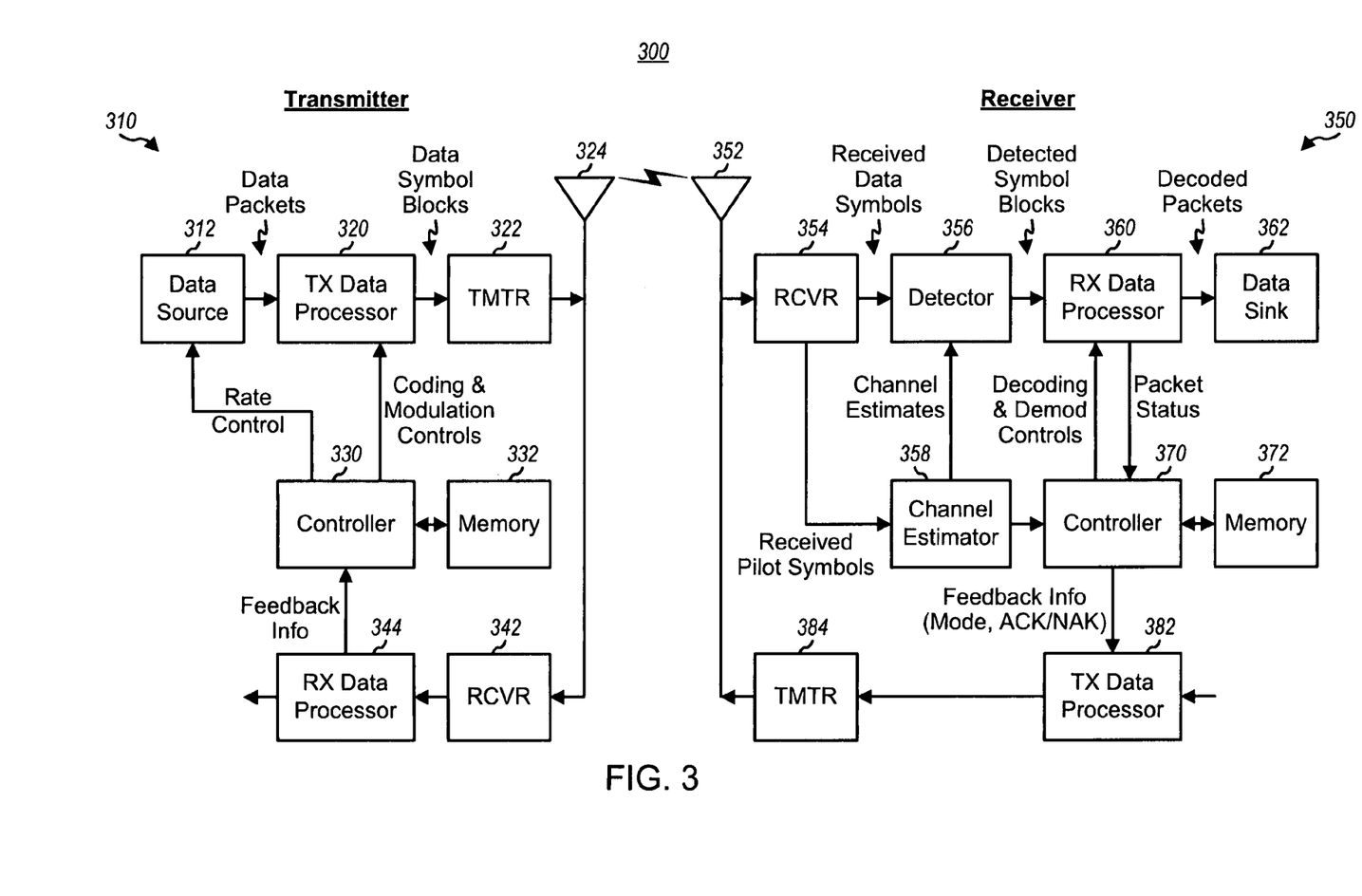
FIG. 3 illustrates a block diagram of a transmitter and receiver.

FIG. 3 illustrates a block diagram of a transmitter 310 and a receiver 350 in a wireless communication system 300 that utilizes IR transmission. At transmitter 310, a TX data processor 320 receives data packets from a data source 312. TX data processor 320 processes (e.g., formats, encodes, partitions, interleaves, and modulates) each data packet in accordance with a mode selected for that packet and generates up to T blocks of data symbols for the packet. The selected mode for each data packet may indicate (1) the packet size (i.e., the number of information bits for the packet) and (2) the particular combination of code rate and modulation scheme to use for each data symbol block of that packet. A controller 330 provides various controls to data source 312 and TX data processor 320 for each data packet based on the selected mode as well as the feedback (ACK/NAK) received for the packet, if desired. This process is discussed further with respect to FIG. 2. TX data processor 320 provides a stream of data symbol blocks (e.g., one block for each frame), where the blocks for each packet may be interlaced with the blocks for one or more other packets.

A transmitter unit (TMTR) 322 receives the stream of data symbol blocks from TX data processor 320 and generates a modulated signal. Transmitter unit 322 multiplexes in pilot symbols with the data symbols (e.g., using time, frequency, and/or code division multiplexing) and obtains a stream of transmit symbols. Each transmit symbol may be a data symbol, a pilot symbol, or a null symbol having a signal value of zero. Transmitter unit 322 may perform a form of OFDM modulation if OFDM is used by the system. For example, an OFDMA system employing OFDM schemes may be used. Transmitter unit 322 generates a stream of time-domain samples and further conditions (e.g., converts to analog, frequency upconverts, filters, and amplifies) the sample stream to generate the modulated signal. The modulated signal is then transmitted from an antenna 324 and via a communication channel to receiver 350.

At receiver 350, the transmitted signal is received by an antenna 352, and the received signal is provided to a receiver unit (RCVR) 354. Receiver unit 254 conditions, digitizes, and pre-processes (e.g., OFDM demodulates) the received signal to obtain received data symbols and received pilot symbols. Receiver unit 354 provides the received data symbols to a detector 356 and the received pilot symbols to a channel estimator 358. Channel estimator 358 processes the received pilot symbols and provides channel estimates (e.g., channel gain estimates and SINR estimates) for the communication channel. Detector 356 performs detection on the received data symbols with the channel estimates and provides detected data symbols to an RX data processor 360. The detected data symbols may be represented by log-likelihood ratios (LLRs) for the code bits used to form the data symbols (as described below) or by other representations. Whenever a new block of detected data symbols is obtained for a given data packet, RX data processor 360 processes (e.g., deinterleaves and decodes) all detected data symbols obtained for that packet and provides a decoded packet to a data sink 362. RX data processor 360 also checks the decoded packet and provides the packet status, which indicates whether the packet is decoded correctly or in error.

A controller 370 receives the channel estimates from channel estimator 358 and the packet status from RX data processor 360. Controller 370 selects a mode for the next data packet to be transmitted to receiver 350 based on the channel estimates. Controller 370 also assembles feedback information, which may include the selected mode for the next packet, an ACK or a NAK for the packet just decoded, and so on. The feedback information is processed by a TX data processor 382, further conditioned by a transmitter unit 384, and transmitted via antenna 352 to transmitter 310.

At transmitter 310, the transmitted signal from receiver 350 is received by antenna 324, conditioned by a receiver unit 342, and further processed by an RX data processor 344 to recover the feedback information sent by receiver 350. Controller 330 obtains the received feedback information, uses the ACK/NAK to control the IR transmission of the packet being sent to receiver 350, and uses the selected mode to process the next data packet to send to receiver 350.

Controllers 330 and 370 direct the operation at transmitter 310 and receiver 350, respectively. Memory units 332 and 372 provide storage for program codes and data used by controllers 330 and 370, respectively.

Figure 4:
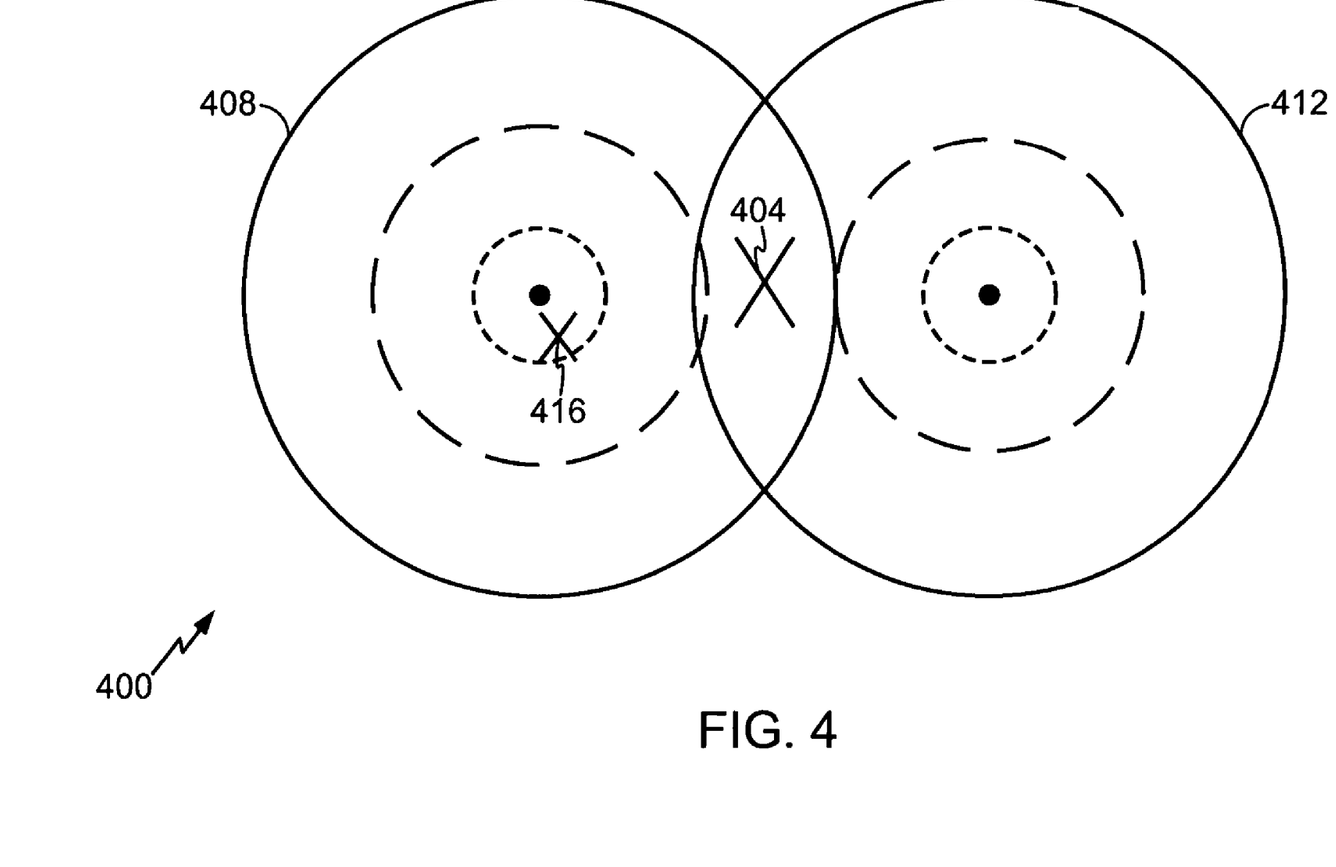
FIG. 4 illustrates an access terminal operating in proximity in two access points.

FIG. 4 illustrates a user operating in proximity to two distinct access points 400. The user 404 is an edge user who has the ability to detect signals from more than one access point. The term "edge user" in this context refers to an access terminal that is in range, but relatively far from the center of transmission of the access point.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber station, subscriber unit, mobile station, wireless device, mobile, remote station, remote terminal, user terminal, user agent, or user equipment. A subscriber station may be a cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals or other access points. The access point acts as a router between the access terminal and the rest of the access network, which may include an IP network, by converting received air-interface frames to IP packets. Access points also coordinate the management of attributes for the air interface. An access point may be a base station, sectors of a base station, and/or a combination of a base transceiver station (BTS) and a base station controller (BSC).

The edge user may also be within range of a neighboring access point. In this case, user 404 is an edge user between access points 408 and 412. Edge user 404 requires a high level of system resources for messages to be transmitted to them in order for information and messages to be sent to user 404. In contrast, a user close to the center of transmission of the access point, such as user 416, is relatively close to the center of transmission of the access point and therefore does not require a higher level of system resources for messages sent to the access terminal.

System resources may comprise a number of factors, such as power level, amount of frequency band or carrier channels available, the amount of time available, or code space such as Walsh Codes or PN Codes as in the case of CDMA.

Figure 5A:
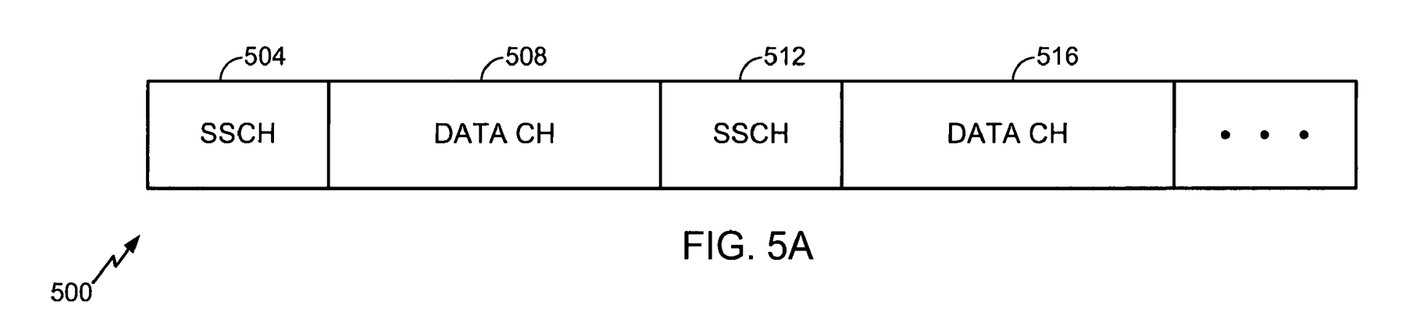
FIG. 5A illustrates structure of the channel over time.

In an embodiment, ACKs are sent as part of a shared signaling channel (SSCH), along with other control information. FIG. 5A illustrates such a channel structure over time 500. Channel structure 500 comprises a SSCH 504 for a particular duration in time, followed by a data message 508. At the end of data message 508 begins the next SSCH 512, and the next data message 516, and so on.

Figure 5B:
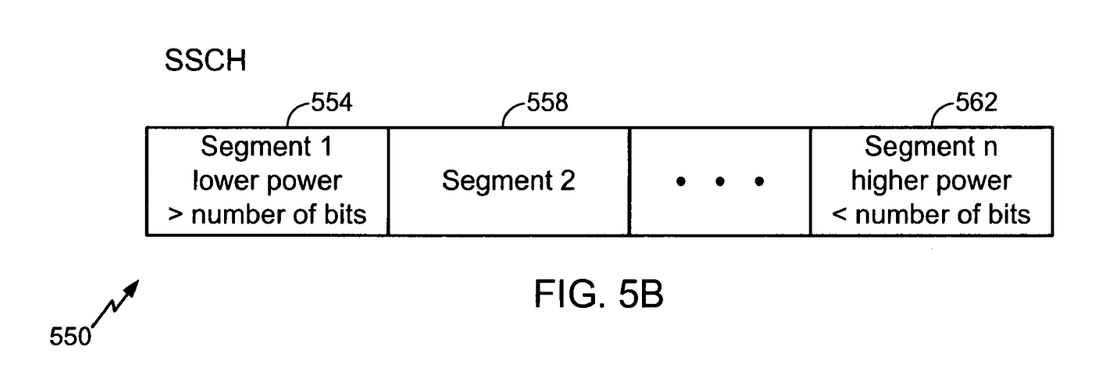
FIG. 5B illustrates structure of the shared signaling channel

The SSCH is in turn divided into a number of segments, as illustrated in FIG. 5B. FIG. 5B illustrates the structure 550 of the SSCH. By using such segmentation, efficiencies are gained by jointly encoding ACK messages together. The first segment of the SSCH comprises, among other information, ACK messages destined for access terminals relatively close to the center of transmission of the access point and may therefore be transmitted at a relatively low power. The segment is represented by segment 554. The second segment 554 is sent to access terminals further from the transmission point of the access point, correspondingly has a fewer number of bits representing ACK messages and is transmitted at a relatively higher power in comparison to the power level of messages sent to access terminals in segment 554. The SSCH segment 550 can be divided into a number of segments until segment N is reached, (562). Segment N represents a relatively few number of bits sent at a higher power level, destined for edge users. Thus, for the edge users that require an ACK message, a substantial portion of system resources are needed in order to send the ACK message. In another embodiment, the segments are division multiplexed in frequency. Different amount of power can be given to different segments to reach different targeted users, or groups of users. For example, if a close-by user only needs to be sent a few bits of data, then segment N may be used with low power. If an edge user needs a few bits, then all the power may be applied to segment N, and effectively none of the other segments are sent.

Figure 7:
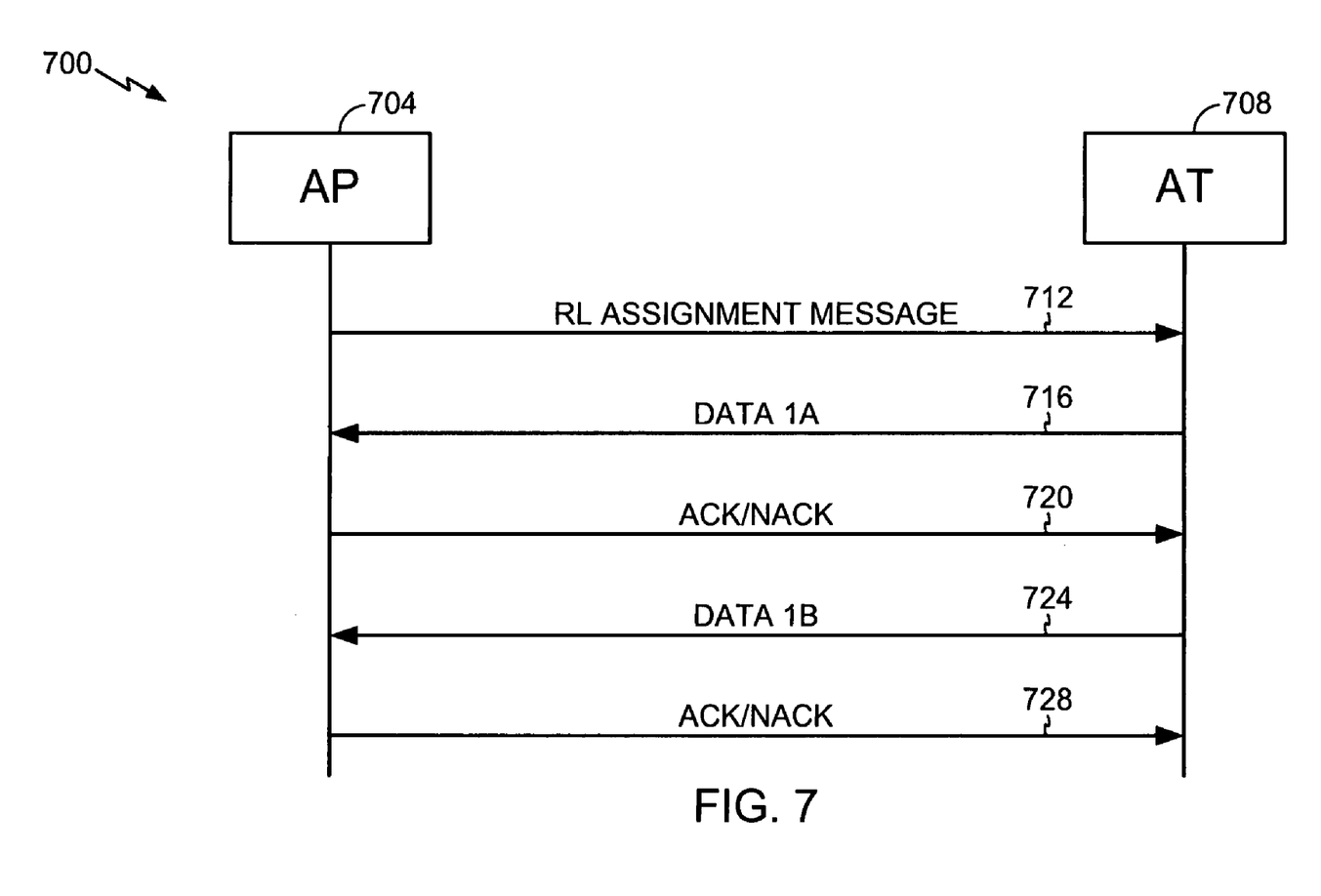
FIG. 7 illustrates a traditional process between an access terminal and an access point without the use of delayed ACKs.

FIG. 7 illustrates a traditional call flow process 700. In this process, ACK/NACK messages are sent to the access terminal each time information is received from the access terminal. As illustrated, the access point 704 sends various messages and receives various messages between it and the access terminal 708. Reverse link assignment messages 712 are sent to the access terminal 708. The reverse link assignment messages specify information such as the set of subcarriers to be used, channel identification, packet format, and various other system and control information. In response to receipt of the reverse link assignment message, data is sent to the access point 704. As by example, data in packet 1A (716) is sent to the access point 704. In response to receiving or not receiving data 1A, the access point 704 transmits an ACK or a NACK 720 to access terminal 708. In an embodiment, only ACKs are transmitted, where NACKs are implicitly understood as being a NACK by non-receipt of an ACK by access terminal 708. In the next time slot, data is sent 724 to the access point 704. By example, data packet 1B may be sent to access point 704 and in response an ACK or a NACK is transmitted 728 to the access terminal 708.

Again, such transmissions of ACKs require substantial system resources. In particular, edge users require a relatively high amount of power to transmit ACK messages.

Figure 6:
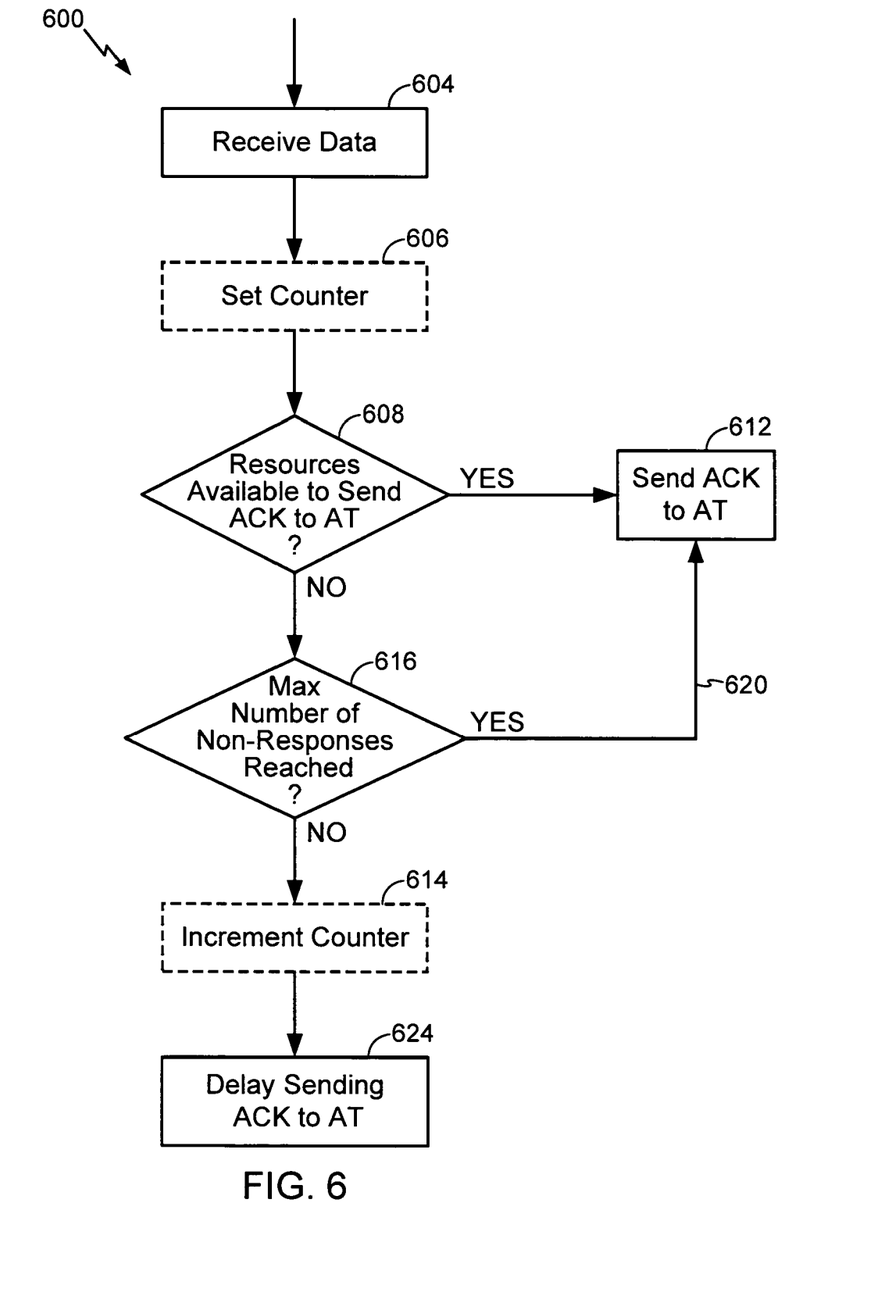
FIG. 6 illustrates a flowchart of a process using delayed ACKs in an access point.

Embodiments provided herein describe methods and apparatus that take advantage of selectively responding with ACK messages when system resources are available, or when it is otherwise convenient to send the ACK messages. FIG. 6 illustrates such a flow chart of a call process taking advantage of using selective ACKs 600. The access point receives data 604 from an access terminal. A determination is then made 608 as to whether there are sufficient system resources to send an ACK message to the access terminal. If such system resources are available, an ACK message is sent to the access terminal 612. This determination includes, but is not limited to, determining the amount of power that is available to send an ACK to a particular access terminal in consideration of the requirements of other access terminals that for which the access point needs to be responsive. The determination also includes determining if sufficient time is available to send an ACK to a particular access terminal in consideration of the requirements of other access terminals for which the access point needs to be responsive. The determination may also include determining if sufficient frequency bandwidth, or enough channels or sub-carriers, are available to send an ACK to a particular access terminal in consideration of the requirements of other access terminals for which the access point needs to be responsive.

If system resources are not available at the present time, another determination is made as to whether or not a threshold number of non-responses is reached 616. A count to be compared against the threshold number may be kept by some counting mechanism, such as a counter 606. If such a threshold number of non-responses is reached, an ACK needs to be sent 612 at this time in order to avoid the user potentially losing its assignment. Other reasons may be used to send an ACK other than the max number of non-responses crossing a threshold. For example, if a high amount of power is required for an ACK to be sent to edge users, the system may decide to wait to send the ACK until such time when system resources will be available. In another example, high quality of service users may need to receive ACK messages more frequently.

If it is determined that the max number of non-responses has not crossed a threshold, or an acknowledgment is not necessary to be sent at that time, the access point can increment the counter 614 and decide to delay 620 sending of that message until a time where there are resources available to send the ACK to the access terminal. Unless the access terminals receive some indication of acknowledgment after a certain number of attempts, the access terminal may assume that it is no longer in communication with the access point. Thus, the counter may be compared against a threshold value, where the threshold value is may be set to the number of attempts. Thus, the access point needs to respond to the access terminals within the threshold number of attempts in order to maintain communications. Therefore, a transmitter is configured to transmit an indication of acknowledgment to the access terminals relatively far from the access point when the counter exceeds the threshold value.

Figure 8:
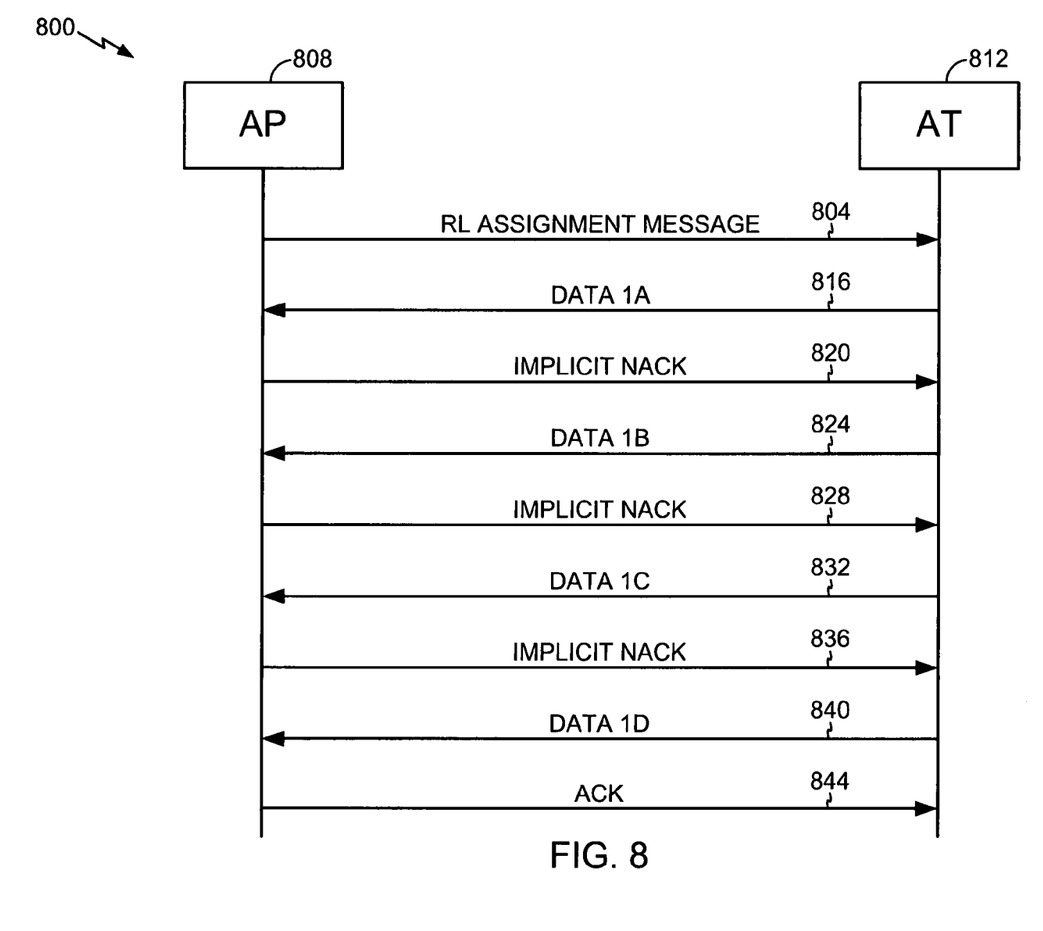
FIG. 8 illustrates a message flow between an access terminal and an access point using selective ACKS.

This is also represented in FIG. 8, which illustrates a call flow 800 using such a selective ACK scheme. Reverse link assignment messages are sent 804 from the access point 808 to the access terminal 812. Access terminal 812 then sends data 816 to the access point 808. Access point 808 may implicitly NACK 820 such that the access terminal 812 does not receive an ACK. Access terminal proceeds to send data packet 1B in step 824. Again, access point 808 may implicitly send aNACK 828 to access terminal 812. Access terminal 812 sends data packet 1C in step 832 to access point 808. Again, access point 808 may implicitly send a NACK 836 to access terminal 812. Data packet 1B represented by act 840 is sent to access point 808. In this example, a maximum number of implicit NACKs messages is reached, and therefore the access point must send an acknowledgment to access terminal 812 in order to avoid the access terminal 812 losing its assignment. Accordingly, an ACK message 844 is sent to access terminal 812.

Figure 9:
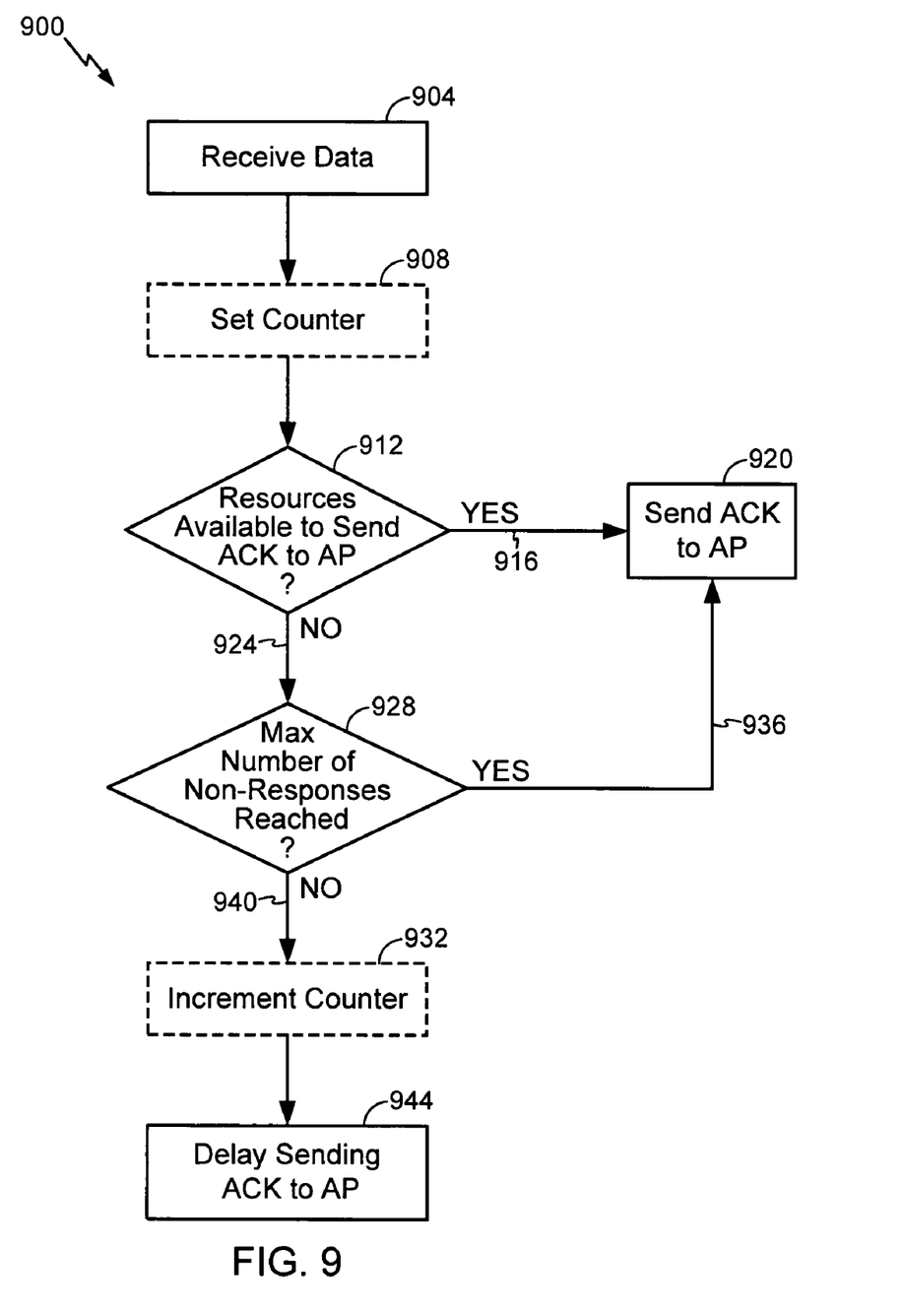
FIG. 9 illustrates a flowchart of a process using delayed ACKs in an access terminal.

Similarly, the access terminal may delay messaging to the access point based on availability of system resources. FIG. 9 illustrates such a process. The access terminal receives data 904 from an access point. A counter may optionally be set 908. A determination is then made 912 as to whether there are sufficient system resources to send an ACK message to the access point. If such system resources are available 916, an ACK message is sent 920 to the access point. This determination includes, but is not limited to, determining the amount of power, time, or frequency bandwidth that is available to send an ACK to the access point in consideration of the requirements of other messages for which the access terminal needs to be responsive. For example, the access terminal needs sufficient power to send data transmissions, various quality of service or signaling information, control channel information, control requests, and/or forward-link channel quality information (CQI/DRC).

If system resources are not available 924 at the present time, another determination is made 928 as to whether or not a threshold number of non-responses is reached. A count 932 to be compared against the threshold number may be kept by some counting mechanism. If such a threshold number of non-responses is reached 936, an ACK needs to be sent 920 at this time in order to avoid the user potentially losing its assignment. Other reasons may be used to send an ACK other than the max number of non-responses crossing a threshold. For example, if a high amount of power is required for an ACK to be sent to edge users, the system may decide to wait to send the ACK until such time when system resources will be available. In another example, high quality of service users may need to receive ACK messages more frequently.

If it is determined that the max number of non-responses has not crossed a threshold 940, or an acknowledgment is not necessary to be sent at that time, the access terminal can increment the counter 932 and decide to delay 944 sending of that message until a time where there are resources available to send the ACK to the access point. Unless the access point receives some indication of acknowledgment after a certain number of attempts, the access point may assume that it is no longer in communication with the access terminal. Thus, the counter may be compared against a threshold value, where the threshold value is may be set to the number of attempts. Thus, the access terminal needs to respond to the access point within the threshold number of attempts in order to maintain synchronization. Therefore, a transmitter is configured to transmit an indication of acknowledgment to the access point when the counter exceeds the threshold value.

The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

As examples, the various illustrative logical blocks, flowcharts, windows, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method of transmitting acknowledgement from an access point in a multiple access communication system, the method comprising:
   receiving information from an access terminal;
   determining if sufficient resources are available at the access point to send an indication of acknowledgment to the access terminal, the access point being a receiver of the information from the access terminal;
   transmitting the indication of acknowledgment from the access point to the access terminal if sufficient resources are available;

delaying transmission of the indication of acknowledgment to the access terminal if sufficient resources are not available;

receiving information from a second access terminal, wherein a high level of resources is not required to send a second indication of acknowledgment to the second access terminal; and transmitting the second indication of acknowledgment to the second access terminal.

2. The method set forth in claim 1, wherein the delaying transmission comprises incrementing a counter.

3. The method set forth in claim 2, further comprising transmitting the indication of acknowledgment to the access terminal when the counter exceeds a predetermined threshold.

4. The method set forth in claim 1 wherein the transmitting the indication of acknowledgment comprises transmitting the indication of acknowledgment for incremental redundancy.

5. The method set forth in claim 1, further comprising transmitting in accordance with an Automatic Repeat Request (ARQ) protocol.

6. The method set forth in claim 1, wherein the determining if sufficient resources are available comprises determining if sufficient power is available to send the indication of acknowledgment.

7. The method set forth in claim 1, wherein the determining if sufficient resources are available comprises determining if sufficient time is available to send the indication of acknowledgment.

8. The method set forth in claim 1, wherein the determining if sufficient resources are available comprises determining if sufficient channels are available to send the indication of acknowledgment.

9. The method set forth in claim 1, wherein the transmitting the indication of acknowledgment comprises
transmitting the indication of acknowledgment to the access terminal in accordance with a Frequency Division Multiplex (FDM) scheme if sufficient resources are available.

10. The method set forth in claim 1, wherein the transmitting the indication of acknowledgment comprises
transmitting the indication of acknowledgment to the access terminal in accordance with a Code Division Multiplex (CDM) scheme if sufficient resources are available.

11. The method set forth in claim 1, wherein the transmitting the indication of acknowledgment comprises
transmitting the indication of acknowledgment to the access terminal in accordance with an Orthogonal Frequency Division Multiplex (OFDM) scheme if sufficient resources are available.

12. The method set forth in claim 1, wherein the transmitting the indication of acknowledgment comprises
transmitting the indication of acknowledgment to the access terminal in accordance with an Orthogonal Frequency Division Multiple Access (OFDMA) scheme if sufficient resources are available.

13. An apparatus for transmitting acknowledgement from an access point in a multiple access communication system, the apparatus comprising:
means for receiving information from an access terminal;
means for determining if sufficient resources are available at the access point to send an indication of acknowledgment to the access terminal, the access point being a receiver of the information from the access terminal;
means for transmitting the indication of acknowledgment from the access point to the access terminal if sufficient resources are available;
means for delaying transmission of the indication of acknowledgment to the access terminal if sufficient resources are not available;
means for receiving information from a second access terminal at the access point, wherein a high level of resources is not required to send a second indication of acknowledgment to the second access terminal; and
means for transmitting the second indication of acknowledgment to the second access terminal.

14. The apparatus set forth in claim 13, wherein the means for delaying transmission comprises means for incrementing a counter.

15. The apparatus set forth in claim 14, further comprising
means for transmitting the indication of acknowledgment to the access terminal when the counter exceeds a predetermined threshold.

16. The apparatus set forth in claim 13, wherein the means for transmitting the indication of acknowledgment comprises means for transmitting the indication of acknowledgment for incremental redundancy.

17. The apparatus set forth in claim 13, further comprising
means for transmitting in accordance with an Automatic Repeat Request (ARQ) protocol.

18. The apparatus set forth in claim 13, wherein the means for determining if sufficient resources are available comprises means for determining if sufficient power is available to send the indication of acknowledgment.

19. The apparatus set forth in claim 13, wherein the means for determining if sufficient resources are available comprises means for determining if sufficient time is available to send the indication of acknowledgment.

20. The apparatus set forth in claim 13, wherein the means for determining if sufficient resources are available comprises means for determining if sufficient channels are available to send the indication of acknowledgment.

21. The apparatus set forth in claim 13, wherein the means for transmitting the indication of acknowledgment comprises
means for transmitting the indication of acknowledgment to the access terminal in accordance with a Frequency Division Multiplex (FDM) scheme if sufficient resources are available.

22. The apparatus set forth in claim 13, wherein the means for transmitting the indication of acknowledgment comprises
means for transmitting the indication of acknowledgment to the access terminal in accordance with a Code Division Multiplex (CDM) scheme if sufficient resources are available.

23. The apparatus set forth in claim 13, wherein the means for transmitting the indication of acknowledgment comprises
means for transmitting the indication of acknowledgment to the access terminal in accordance with an Orthogonal Frequency Division Multiplex (OFDM) scheme if sufficient resources are available.

24. The apparatus set forth in claim 13, wherein the means for transmitting the indication of acknowledgment comprises
means for transmitting the indication of acknowledgment to the access terminal in accordance with an Orthogonal Frequency Division Multiple Access (OFDMA) scheme if sufficient resources are available.

25. An apparatus configured to transmit acknowledgement in a multiple access system, the apparatus comprising:
a receiver configured to receive information from an access terminal;

a processor configured to determine if sufficient resources are available at an access point to send an indication of acknowledgment to the access terminal, the access point being a receiver of the information from the access terminal;

a transmitter configured to transmit the indication of acknowledgment to the access terminal if sufficient resources are available; and a controller configured to delay transmission of the indication of acknowledgment to the access terminal if sufficient resources are not available, wherein the receiver is further configured to receive information from a second access terminal, wherein a high level of resources is not required to send a second indication of acknowledgment to the second access terminal, and wherein the transmitter is further configured to transmit the second indication of acknowledgment to the second access terminal.

26. The apparatus set forth in claim 25, further comprising a counter configured to keep track of the quantity of messages received from the access terminal.

27. The apparatus set forth in claim 26, further comprising a compare configured to compare a value generated by the counter with a threshold value.

28. The apparatus of claim 27, wherein the transmitter is configured to transmit the indication of acknowledgment to the access terminal when the counter exceeds the threshold value.

29. A machine-readable medium comprising instructions which, when executed by a machine, cause the machine to perform operations including:

receiving information from an access terminal;

determining if sufficient resources are available at an access point to send an indication of acknowledgment to the access terminal, the access point being a receiver of the information from the access terminal;

transmitting the indication of acknowledgment from the access point to the access terminal if sufficient resources are available;

delaying transmission of the indication of acknowledgment to the access terminal if sufficient resources are not available;

receiving information from a second access terminal, wherein a high level of resources is not required to send a second indication of acknowledgment to the second access terminal; and transmitting the second indication of acknowledgment to the second access terminal.

30. The medium set forth in claim 29, wherein the determining if sufficient resources are available comprises determining if sufficient power, time, or frequency channels are available to send the indication of acknowledgment.

31. A method of transmitting acknowledgement in a multiple access communication system, the method comprising:

receiving information from a transmitter;

determining if sufficient resources are available at a receiver to send an indication of acknowledgment to the transmitter;

transmitting the indication of acknowledgment to the transmitter if sufficient resources are available;

delaying transmission of the indication of acknowledgment if sufficient resources are not available;

receiving information from a second transmitter, wherein a high level of resources is not required to send a second indication of acknowledgment to the second transmitter; and transmitting the second indication of acknowledgment to the second transmitter.

32. The method set forth in claim 31, wherein the determining if sufficient resources are available comprises determining if sufficient power, time, or frequency channels are available to send the indication of acknowledgment.

* * * * *

UNITED STATES PATENT AND TRADEMARK OFFICE
CERTIFICATE OF CORRECTION

PATENT NO. : 7,440,399 B2
APPLICATION NO. : 11/021790
DATED : October 21, 2008
INVENTOR(S) : David Jonathan Julian and Edward Harrison Teague It is certified that error appears in the above-identified patent and that said Letters Patent is hereby corrected as shown below:

In column 13, claim 27, line 24, "a compare configured", should be, --a comparer configured--

Signed and Sealed this

Thirtieth Day of March, 2010

David J. Kappos
*Director of the United States Patent and Trademark Office*